Patented Mar. 24, 1925.

1,531,263

UNITED STATES PATENT OFFICE.

ARTHUR HUGH DAVIES, DECEASED, LATE OF WILLENHALL, ENGLAND; BY MARY OLIVIA DAVIES, ADMINISTRATRIX, OF WILLENHALL, ENGLAND; AND ROBERT FRASER THOMSON, OF CARLISLE, ENGLAND, ASSIGNORS TO SCOTTISH DYES LIMITED, OF CARLISLE, CUMBERLAND COUNTY, ENGLAND.

PRODUCTION OF COLORING MATTERS.

No Drawing.   Application filed August 24, 1923.   Serial No. 659,234.

*To all whom it may concern:*

Be it known that we, MARY OLIVIA DAVIES, administratrix of the estate of the late ARTHUR HUGH DAVIES, a subject of the King of Great Britain and Ireland, and residing at 72, New Road, Willenhall, in the county of Stafford, England, and ROBERT FRASER THOMSON, a subject of the King of Great Britain and Ireland, and residing at Murrell Hill Works, Carlisle, in the county of Cumberland, England, do hereby declare that the said ARTHUR HUGH DAVIES, deceased, and ROBERT FRASER THOMSON have invented certain new and useful Improvements in the Production of Coloring Matters, of which the following is a specification.

This invention relates to the production of coloring matters either as dyes or intermediates for the production of dyes.

It has for its object to provide an improved or new series of such coloring matters. We have made a large number of experiments and have found a new series of oxidation products which can act as dyes or intermediates for the production of dyes.

The basis of these products may be regarded as substituted dibenzanthrones, this term including for example dimethyl-dibenzanthrone and dinaphthalimide, all of which bodies may be considered to contain a ketonic perylene group, that is to say, the perylene nucleus with other pairs of ring formations joined to the perylene nucleus at positions indicated by 3 : 4 and 3' : 4' and which have in these additional ring formations at least one ketonic group, that is, the whole molecule contains at least one pair of ketonic groups. Dibenzanthrone itself would be included in this latter definition, for which reason we refer to the basis of the new series of oxidation products as substituted dibenzanthrones.

We have also found that these oxidation products are capable of being reduced, but not necessarily back to the parent body, by such substances as sulphites.

We have also found that these oxidation products form compounds with sulphuric acid which can be used as a means of isolating the required bodies as these sulphuric acid compounds are readily decomposed on treatment with excess of water giving products in a form suitable for use in further reactions or themselves as dyestuffs.

The accompanying diagram represents in a conventional manner what may be regarded as the constitutional formulæ of dibenzanthrone, the perylene ring system being shown in heavy lines.

In the following table a list is given of some of the oxidation products according to the present invention, together with the colour of the body in strong sulphuric acid, and the colour of cotton dyed with the product from an alkaline hydrosulphite bath.

| Oxidized body subsequently reduced derived from the product of the caustic fusion of— | Colour in strong $H_2SO_4$ | Colour of dyed cotton |
|---|---|---|
| (bz) Chlor-benzanthrone (that is, chlor-benzanthrone with the chlorine atom in the benzene ring) (oxidized with $MnO_2$ and $H_2SO_4$.) | Olive green. | Olive. |
| (bz) Chlor-benzanthrone (nitrated, reduced, diazotized and boiled). | Olive green. | Green. |
| Chlor-benzanthrone (from 2-chlor-anthraquinone, the chlorine atom being in the anthraquinone nucleus). | Brown. | Greenish-blue. |
| Chlor-benzanthrone (from 1-chlor-anthraquinone). | Violet. | Olive. |
| Naphtho-benzanthrone | Green. | Purplish-grey. |
| Naphthalene-1:8-dicarboxylic acid imide. | Greenish-blue. | Bluish-grey. |

Our invention in brief consists in the production of dyes or intermediates by the oxidation of a substituted dibenzanthrone.

The following examples are given to illustrate method for the production of oxidation products of bodies containing a perylene nucleus:

*Example I.*

10 parts of purified dibenzanthrone dissolved in 200 parts of sulphuric acid, 66° Bé., and 5 parts of crystalline boric acid are treated with 10 parts of manganese dioxide and 20 parts of sulphuric acid, 66° Bé., at such a rate that the temperature rises to 60° C., at which temperature the whole is then kept for one hour. The oxidation product is isolated according to well-known methods. This dyestuff gives a dull olive green shade on cotton which becomes dull grey-blue on making acid.

Example II.

The oxidation products in general may be purified by treatment with strong sulphuric acid in the particular manner described for the oxidation product of dibenzanthrone below:—

10 parts of the oxidation product of dibenzanthrone in the state of fine powder are dissolved in 400 parts of strong sulphuric acid at 60° C. The correct amount of water is now added to the solution to reduce the concentration of the sulphuric acid to 85%. After allowing to stand for 12 hours the mixture is filtered and washed with sulphuric acid of the same strength. The precipitate consists of a pure form of the oxidation product, and is worked up by diluting with water, boiling up, reducing with sodium bisulphite and filtering.

The purity of the product can be demonstrated by dye tests, and it is found that shades are obtained of a bright yellow-olive colour, considerably more brilliant and intense than can be obtained from the crude produc. The acid filtrates containing a further quantity of considerably less pure oxidation product.

The shades obtained from the latter are considerably duller and weaker.

Example III.

10 parts of the dyestuff obtained by the fusion with potash of the condensation product of 2-chloranthraquinone with glycerine are dissolved along with 5 parts of crystalline boric acid in 350 parts of strong sulphuric acid. To the solution are added 12 parts of manganese dioxide, the temperature being then raised and maintained at 60° for several hours.

The product is then worked up by diluting with water, boiling up, reducing with sodium bisulphite and filtering. After washing the product consists of 40 parts of paste of a dull brown colour, which gives in strong sulphuric acid a solution unaffected by copper, and giving a green precipitate on dilution.

It dyes cotton blue shades, which are not fast to the action of acids or alkalies.

Example IV.

5 parts of dichlor-dibenzanthrone (prepared by treating dibenzanthrone in nitrobenzene solution with sulphuryl chloride) are dissolved along with 2½ parts of crystalline boric acid in 400 parts of strong sulphuric acid. 7½ parts of manganese dioxide are then added and the solution is then raised to and maintained at 60° C. for two hours.

The product is worked up by the usual method as described in Example III.

The product consists of 25 parts of a dark yellowish brown paste, which gives in strong sulphuric acid a brilliant red violet colour, and on the addition of water, gives first a brown sulphuric acid compound, and on further dilution, a yellow-olive precipitate.

The product dyes cotton from the hydrosulphite vat yellow-olive shades, which are not fast to the action of acids and alkalies.

In the preparation of the oxidation products described above we have mentioned the use of manganese dioxide and sulphuric acid, but other oxidizing agents such as nitric acid can be employed with suitable results. The parent bodies containing the perylene nucleus may also be nitrated, reduced, diazotized and boiled to form oxycompounds that behave in general similarly to those described above.

Having now described our invention, what we claim as new and desire to secure by Letters Patent is:—

1. Oxidation products of substituted dibenzanthrones.

2. Oxidized and subsequently reduced derivatives of substituted dibenzanthrones.

In testimony whereof we have signed our names to this specification.

MARY OLIVIA DAVIES,
*Administratrix of Arthur Hugh Davies, deceased.*
ROBERT FRASER THOMSON.